Aug. 5, 1924.
C. WICKSTEED
1,504,008
BREAD AND BUTTER MACHINE
Filed Jan. 26, 1923
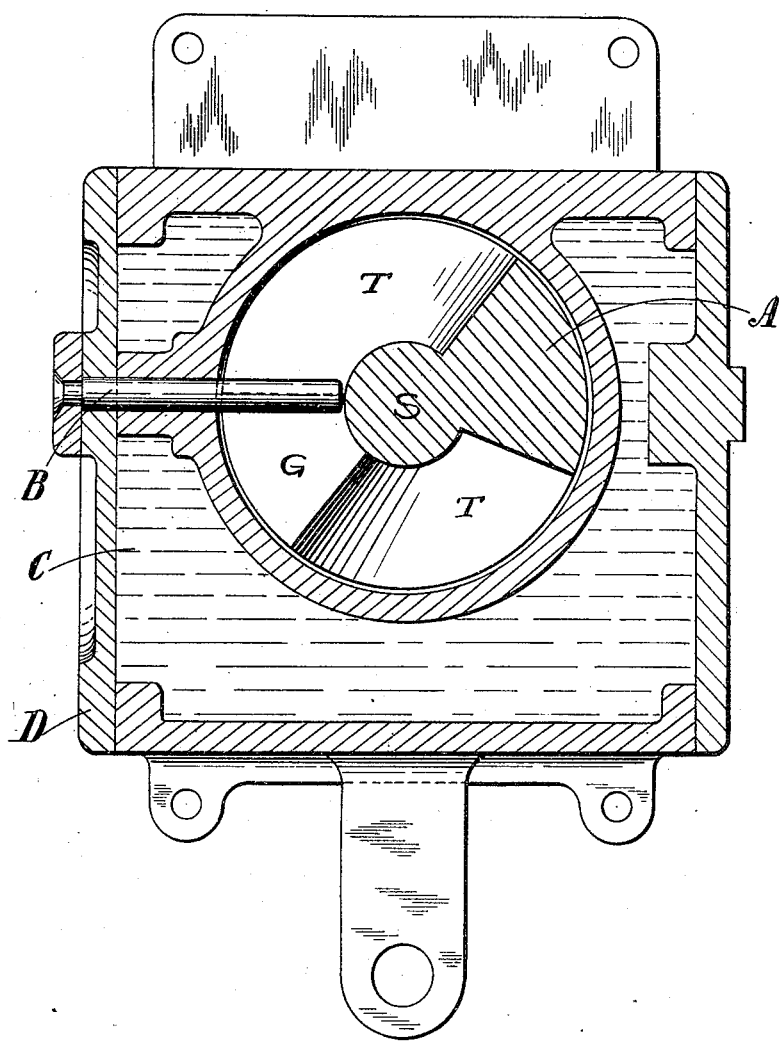
INVENTOR
Charles Wicksteed
By Byrnes, Stebbins & Parmelee
His Attys Patented Aug. 5, 1924.

1,504,008

UNITED STATES PATENT OFFICE.

CHARLES WICKSTEED, OF KETTERING, ENGLAND.

BREAD AND BUTTER MACHINE.

Application filed January 26, 1923. Serial No. 615,017.

*To all whom it may concern:*

Be it known that I, CHARLES WICKSTEED, a subject of the King of England, residing in Kettering, county of Northampton, England, have invented certain new and useful Improvements in Bread and Butter Machines, of which the following is a specification.

This invention is for improvements in or relating to bread and butter machines and has for its object to provide means whereby the butter may be at all times maintained at the proper consistency for spreading.

According to the present invention there is provided a butter container for a bread and butter cutting and spreading machine having means for churning the butter and feeding the same to the butter roller (for example a screw-feed with stationary pins interposed between the threads of the screw) with a water jacket around the container to receive water at a predetermined temperature in order to supply butter to the said butter roller at the desired consistency.

The invention is more particularly described with reference to the accompanying drawing, in which there is illustrated the feeding chamber of a butter container provided with a water jacket, the view being a transverse section through the container and its water jacket.

Referring to the drawing which illustrates one method of carrying the invention into effect, A illustrates a cylindrical feeding chamber of a butter container of the type used in conjunction with the machine described in United States Patent application Serial No. 589,869, which receives a screw for feeding the butter to a butter roller. The said chamber is provided with pins B which project through the wall of the cylindrical chamber A into the grooves G formed by the screws so that these pins lie between the threads T of the screw and in this way the butter is thoroughly churned up and all of it is brought into contact with the wall of the chamber A. The chamber A is enveloped by a water jacket C having a removable end plate D and the water may be supplied to the said jacket and may be kept at the desired temperature necessary to bring the butter passing through the chamber A to its proper consistency in any desired manner. Due to the fact that the butter container is provided with the feeding device hereinbefore referred to, the whole of the butter is brought into contact with the wall of the butter container so that it is heated not merely on its outer surface but to the same degree of consistency throughout.

Therefore it will be seen that according to this invention there is provided a water jacket for the butter container which ensures that the butter fed to the roller, which spreads the butter upon the bread, is at the desired consistency.

I claim:

1. The combination with a butter container for a bread and butter cutting and spreading machine, and means for churning the butter in and feeding the same through the container, of a water jacket around the container to receive water at a predetermined temperature in order that butter of the desired consistency may be supplied from the container.

2. The combination of a butter container for a bread and butter cutting and spreading machine, a feed screw therein, stationary pins extending between the threads of the screw for causing the butter to be churned while it is being fed by the screw, and a water jacket around the container to receive water at a predetermined temperature in order to bring the butter to the desired consistency.

In testimony whereof I affix my signature.

CHARLES WICKSTEED.